US009636753B2

(12) United States Patent
Anson et al.

(10) Patent No.: US 9,636,753 B2
(45) Date of Patent: May 2, 2017

(54) ALIGNMENT DEVICE FOR DRILLING OR REAMING AN OPENING IN A STRUCTURE

(71) Applicant: THE COMMONWEALTH OF AUSTRALIA, Edinburgh (AU)

(72) Inventors: Peter George Anson, Mt Macedon (AU); Ian Andrew Anderson, Heatherton (AU)

(73) Assignee: THE COMMONWEALTH OF AUSTRALIA, Edinburgh (AU)

( * ) Notice: Subject to any disclaimer, the term of this patent is extended or adjusted under 35 U.S.C. 154(b) by 9 days.

(21) Appl. No.: 14/378,590

(22) PCT Filed: Feb. 12, 2013

(86) PCT No.: PCT/AU2013/000116
§ 371 (c)(1),
(2) Date: Aug. 13, 2014

(87) PCT Pub. No.: WO2013/120128
PCT Pub. Date: Aug. 22, 2013

(65) Prior Publication Data
US 2015/0056034 A1    Feb. 26, 2015

Related U.S. Application Data

(60) Provisional application No. 61/597,974, filed on Feb. 13, 2012.

(51) Int. Cl.
*B23B 49/02* (2006.01)
*B25H 1/00* (2006.01)

(52) U.S. Cl.
CPC ........ *B23B 49/026* (2013.01); *B23B 2215/04* (2013.01); *B23B 2260/118* (2013.01);
(Continued)

(58) Field of Classification Search
CPC . B23B 49/026; B23B 49/02; B23B 2260/118; B25H 1/0064; B25H 1/0071;
(Continued)

(56) References Cited

U.S. PATENT DOCUMENTS 1,749,514 A * 3/1930 Scott .................. B23C 3/05
                                                408/110
1,770,721 A * 7/1930 Willis ................. B23Q 1/5462
                                                403/131

(Continued)

FOREIGN PATENT DOCUMENTS

CH            683677 A5 *  4/1994  .......... B25H 1/0064
DE         33 26 697 A1    2/1985

(Continued)

OTHER PUBLICATIONS

Machine translation, Swiss patent document, CH683677A5, "Template for drilling bore holes in stone and concrete walls—has vacuum chamber in base plate coupled to vacuum pump by inlet and has rubber seal which compresses when predetermined underpressure is attained", Kaumann A. et al., Apr. 1994.*

(Continued)

*Primary Examiner* — Daniel Howell
*Assistant Examiner* — Chwen-Wei Su
(74) *Attorney, Agent, or Firm* — Seed IP Law Group LLP

(57) ABSTRACT

Embodiments generally relate to an alignment device to assist in drilling or reaming an opening in a structure. The device comprises: a base element, the base element having at least one first fixation element to allow fixation of the device relative to the structure; a positioning element coupled to the base element, wherein a position of the positioning element relative to the base element is adjustable; an alignment element mounted to the positioning element and rotatable in at least two dimensions to allow (Continued)

precise alignment for a drilling or reaming tool with a drilling or reaming site on the structure; at least one second fixation element to allow fixation of the positioning element relative to the base element; and at least one third fixation element to allow fixation of the alignment element relative to the positioning element.

26 Claims, 13 Drawing Sheets

(52) U.S. Cl.
CPC ........ *B23B 2265/36* (2013.01); *B25H 1/0064* (2013.01); *Y10T 408/553* (2015.01); *Y10T 408/554* (2015.01); *Y10T 408/567* (2015.01); *Y10T 408/568* (2015.01); *Y10T 408/56245* (2015.01)

(58) Field of Classification Search
CPC ......... Y10T 408/56245; Y10T 408/553; Y10T 408/554
See application file for complete search history.

(56) References Cited

U.S. PATENT DOCUMENTS

| | | | | |
|---|---|---|---|---|
| 2,026,821 A | * | 1/1936 | Cleveland | B23C 3/05 408/83.5 |
| 2,619,730 A | * | 12/1952 | Carter | B25H 7/00 33/666 |
| 2,740,308 A | * | 4/1956 | Blanchard | B23B 47/288 408/72 R |
| 2,946,246 A | * | 7/1960 | Allan | B23B 49/026 408/115 R |
| 2,991,668 A | | 7/1961 | Keller | |
| 3,162,066 A | * | 12/1964 | Morey | B23B 49/026 125/20 |
| 3,977,805 A | * | 8/1976 | Wanous | B23B 41/12 29/255 |
| 4,899,458 A | * | 2/1990 | Minelli | B23C 3/055 33/520 |
| 5,018,912 A | * | 5/1991 | Reitz | B23B 47/28 144/106 |
| 5,261,150 A | * | 11/1993 | Grube | B23Q 9/0014 248/226.11 |
| 5,468,099 A | | 11/1995 | Wheetley et al. | |
| 6,186,707 B1 | * | 2/2001 | Kain | B23B 49/026 156/253 |
| 7,578,642 B2 | * | 8/2009 | Fritsche | B23Q 1/28 227/110 |
| 7,862,265 B1 | | 1/2011 | Clark | |
| 2009/0010726 A1 | * | 1/2009 | Brugman | B23Q 9/0042 408/1 R |
| 2010/0254778 A1 | * | 10/2010 | Whinnem | B23Q 1/5462 408/1 R |
| 2011/0002751 A1 | * | 1/2011 | Katzenberger | B21J 15/10 408/241 G |

FOREIGN PATENT DOCUMENTS

| | | |
|---|---|---|
| GB | 2 163 074 A | 2/1986 |
| TW | 487029 U | 5/2002 |

OTHER PUBLICATIONS

International Search Report mailed Mar. 25, 2013, for corresponding International Application No. PCT/AU2013/000116, 5 pages.

\* cited by examiner

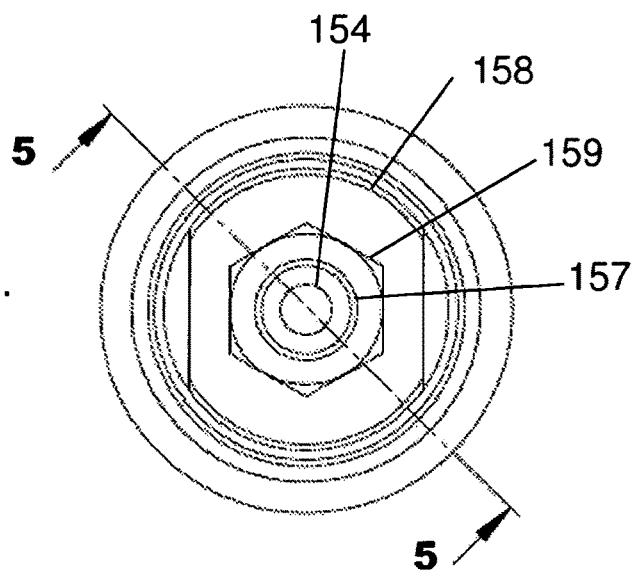
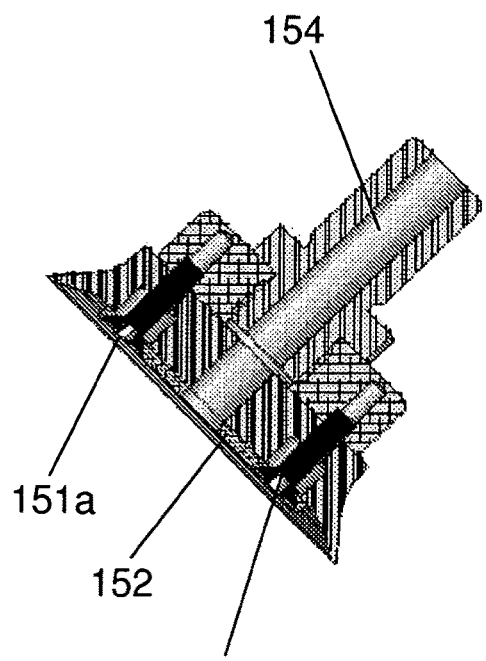
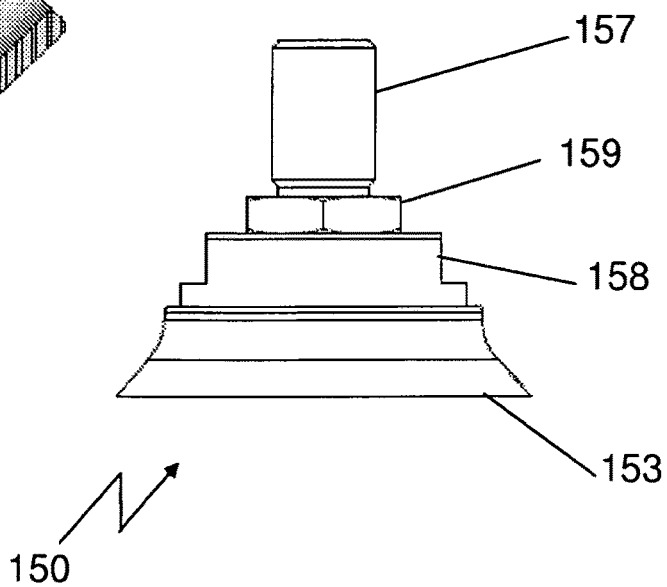
Figure 10B.
Figure 10C.
Figure 10A.

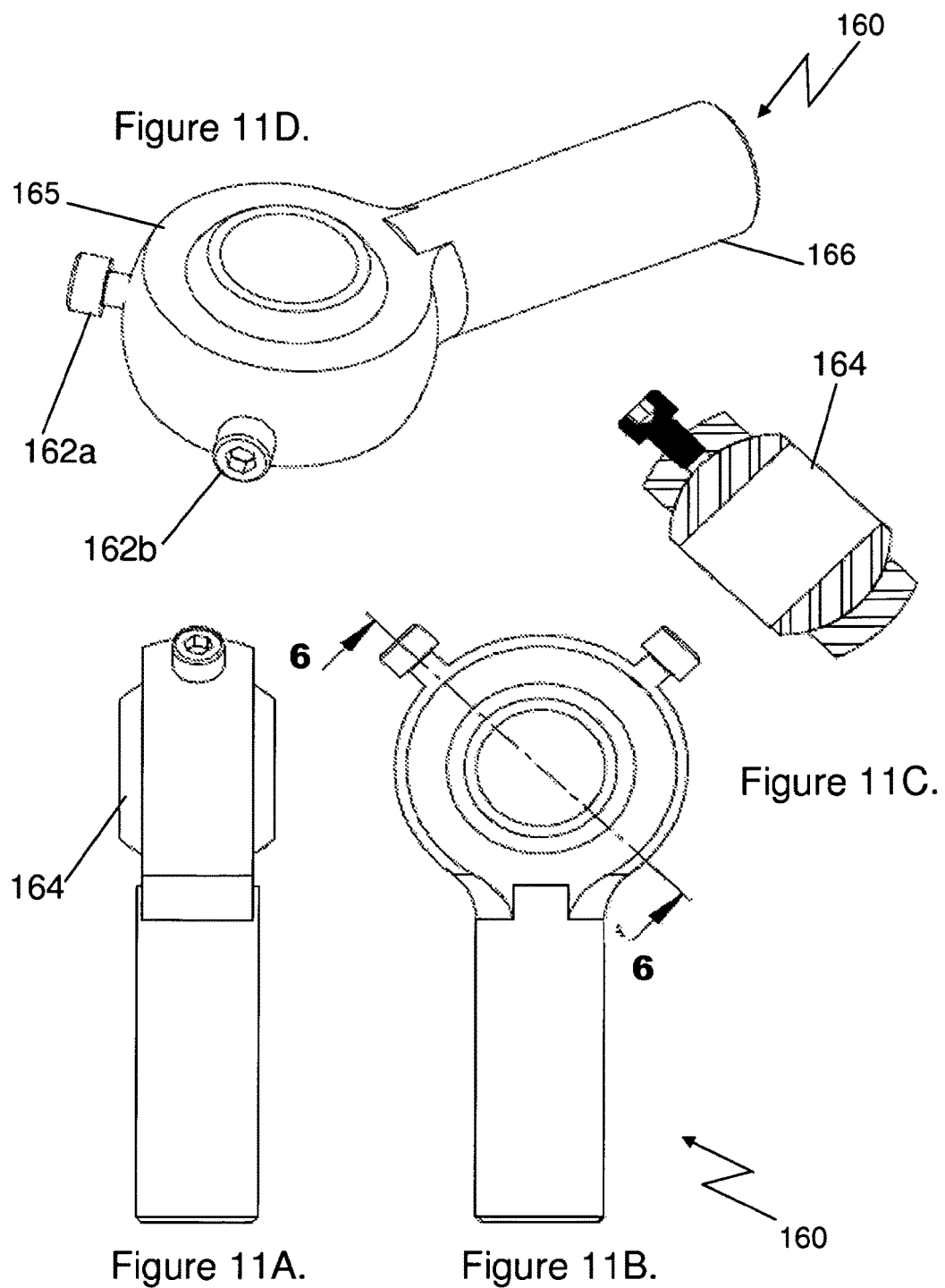

ALIGNMENT DEVICE FOR DRILLING OR REAMING AN OPENING IN A STRUCTURE

TECHNICAL FIELD

Described embodiments are generally directed to devices that are usable for aligning drilling and/or reaming tools to a high degree of accuracy on a structure to be drilled or reamed, such as the wings and fuselage of aircraft structures.

BACKGROUND

In the modern aircraft industry, it is sometimes necessary to rework existing fastener holes in metallic aircraft skins and panels in-situ. The fasteners used today are often precision-fit or interference-fit fasteners, which require precise tolerances on the holes they are to be used in conjunction with. The holes may be reworked for the purpose of removing any surface scratches or marks around a hole that may affect the structural integrity of the joint under high load conditions. Even miniscule surface defects may act as stress raisers and invoke rapid crack propagation through a structure if left unattended under severe load conditions.

Removing a structural component for rework can be difficult and time consuming and may introduce more potential problems. It is therefore necessary to be able to rework holes in all locations of the aircraft skin, including tight confined areas, under the wings, under the fuselage and around obstructions. The rework may consist of drilling holes or reaming holes to return them to precise tolerances. This may require rework of miniscule increments, often carried out with a hand held electric or air operated drill or reamer. Due to the difficulty of accessing these locations it is common for this kind of rework to be done by hand but this causes other potential problems.

Due to the precise nature of the holes to be drilled, a recurring problem is with the alignment of a hand held drill or reamer. The tolerances to be met when reworking a hole may be as small an increase as 0.004 of an inch in diameter. As the ratio of diameter to length on some fastener holes can be large, the alignment of the drill or reamer is important. Any misalignment of the hand held rework tools will lead to the hole no longer remaining round along its full bore.

It is important not just to remove surface defects and scratches but to maintain a constant round hole for the application of the new fastener. All reworked holes are examined, and must pass examination, before an aircraft can be certified safe to go back into service. Further rework will be required if reworked holes do not meet requirements, to maintain the aircraft's structural life. If holes cannot be reworked to the necessary tolerances, the aircraft wing or fuselage may become functionally ineffective and may be junked.

It would be desirable to address or ameliorate one or more shortcomings or disadvantages associated with prior methods and devices for drilling or reworking of fastener holes in structures, or to at least provide a useful alternative thereto.

Any discussion of documents, acts, materials, devices, articles or the like which has been included in the present specification is not to be taken as an admission that any or all of these matters form part of the prior art base or were common general knowledge in the field relevant to the present invention as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF SUMMARY

Embodiments generally relate to an alignment device to assist in drilling or reaming an opening in a structure, the device comprising: a base element, the base element having at least one first fixation element to allow fixation of the device relative to the structure; a positioning element coupled to the base element, wherein a position of the positioning element relative to the base element is adjustable; an alignment element mounted to the positioning element and rotatable in at least two dimensions to allow precise alignment for a drilling or reaming tool with a drilling or reaming site on the structure; at least one second fixation element to allow fixation of the positioning element relative to the base element; and at least one third fixation element to allow fixation of the alignment element relative to the positioning element.

The at least one first fixation element may comprise at least two suction feet and in some embodiments the at least two suction feet may comprise three suction feet. The three suction feet may be arranged at respective vertices of a triangle. The base element may have a triangular shape and the three suction feet may be arranged at the vertices of the triangular shape.

In some embodiments, the at least one first fixation element comprises three pneumatically actuable suction feet.

In certain embodiments, the at least one first fixation element comprises a plate extending away from the position of the positioning element and arranged to allow fixation of the base element relative to the structure by clamping of the plate to the structure. The plate may be integrally formed with the base element.

The at least one third fixation element may comprise two manually operable fixation components. The at least one second fixation element may be pneumatically actuable.

The at least one second fixation element may have opposed first and second portions positioned to allow fixation relative to at least part of the base element. The first portion may include a pneumatically actuable locking piston to fix the position of the positioning element relative to the base element.

The positioning element may comprise a positioning arm extending away from the base element, the alignment element being mounted to the positioning arm. The positioning arm may be removably coupled to a central portion of the positioning element.

The positioning element may have multiple coupling locations to which the positioning arm is removably coupleable.

Some embodiments of the device further comprise a handle coupled to the base element to assist in positioning the device relative to the structure. The structure may be an aircraft structure. The device may be sized to be manually transportable. The device may have a size and weight to allow it to be manually positionable relative to the structure using one hand.

The device may be arranged to be free of contact with the structure other than at the at least one first fixation element.

The positioning element may be slidably adjustable relative to the base element.

In some embodiments, the adjustment of the positioning element relative to the base element is limited by abutment of part of the positioning element with part of the base element.

Some embodiments relate to a device to assist in drilling or reaming an opening on a surface, the device comprising: a body, being removably affixable to a surface of the object to be drilled or reamed; an arm, wherein a position of the arm is adjustable and fixable relative to the body; and a receptacle adapted to receive a drilling or reaming tool or an alignment tool, wherein the receptacle is positioned at one end of the arm, the receptacle is rotatable in two dimensions relative to the arm, and the position of the receptacle is fixable relative to the arm.

Some embodiments relate to a kit comprising the device (as described herein) to assist in drilling or reaming an opening in a structure, and further comprising a locating pin. In some embodiments, the locating pin comprises an upper part shaped to be received by the alignment element or receptacle and manually manipulable to align an axis of the alignment element with the opening in the structure; and a lower part shaped to be received by the opening in the structure. Some embodiments of the kit further comprise at least one bushing receivable in the alignment element to act as a guide for the drilling or reaming tool.

BRIEF DESCRIPTION OF THE DRAWINGS

Embodiments are described in further detail below, wherein like reference numerals indicate similar parts throughout the several views. Embodiments are illustrated by way of example, and not by way of limitation, with reference to the accompanying drawings and legend, in which:

FIG. 10A is a side view of a vacuum clamp and vacuum cup assembly (or second fixation element);

FIG. 10B is a top view of the vacuum clamp and vacuum cup assembly;

FIG. 10C is a section along line 5-5 of FIG. 10B through the vacuum clamp and vacuum cup assembly;

FIG. 11A is a side view of a positioning arm;

FIG. 11B is a top view of the positioning arm;

FIG. 11C is a section along line 6-6 of FIG. 11B through the head of the positioning arm;

FIG. 11D is a perspective view of the positioning arm;

DETAILED DESCRIPTION

Described embodiments are generally directed to devices for aligning drilling and/or reaming tools to a high degree of accuracy on a non-linear surface, more specifically for use on the wings and fuselage of aircraft structures.

Referencing FIGS. 1 to 5 and 9 to 13, a device 100 is shown that assists in the alignment of hand held tools when used for drilling or reworking holes in structures, such as aircraft panels and skins. The device 100 can be used for an alignment method that is quick and accurate and significantly improves the quality and tolerances of hand reworked holes. The device 100 is an embodiment with mounting feet, which can be used as a form of mounting means to attach the device to the structure that is being reworked. The mounting feet may be substituted by other mounting means, such as one or more magnetic mounting or coupling portions, for example.

Figure 6:
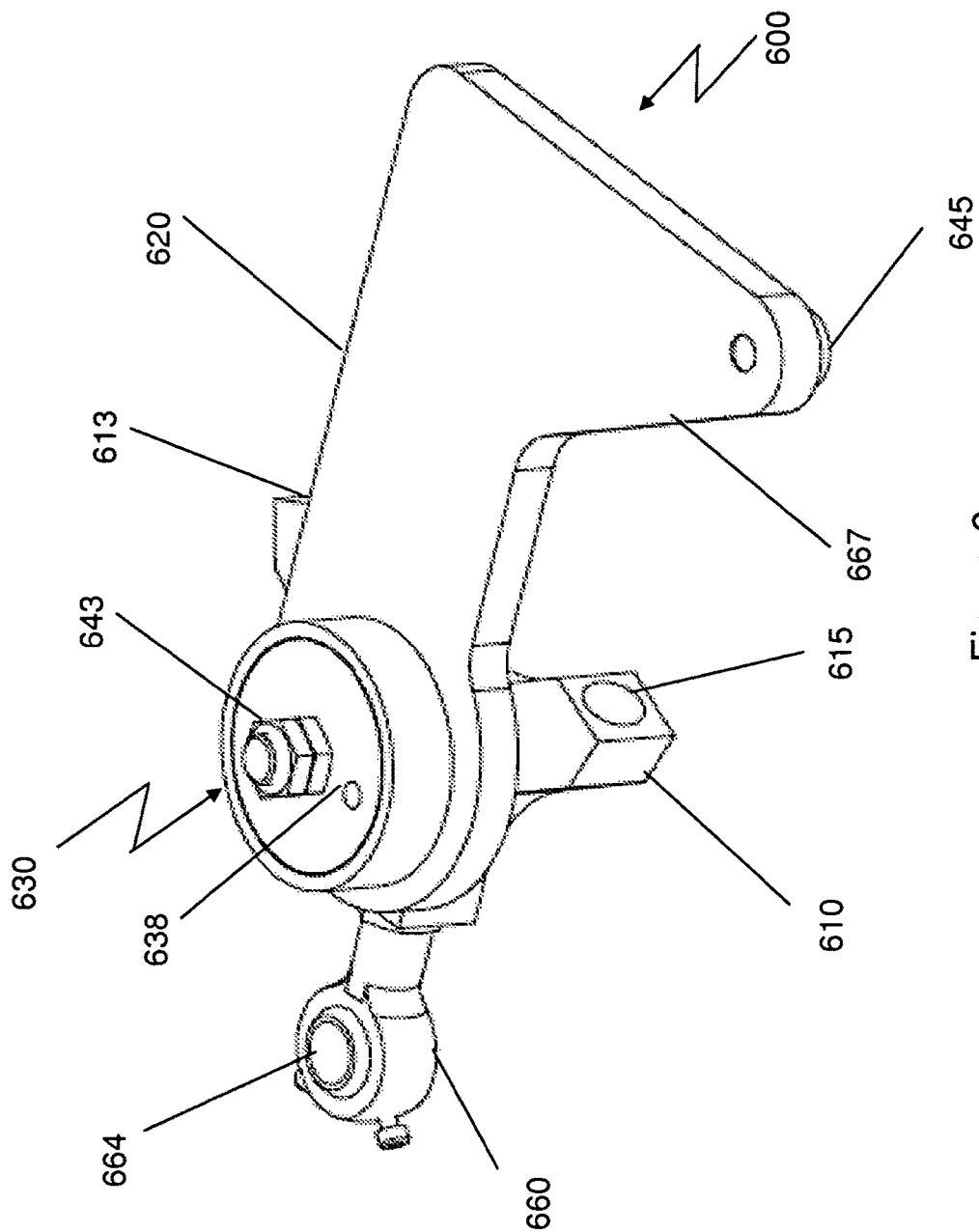
FIG. 6 is a perspective view of a further embodiment of the device.
Figure 7A:
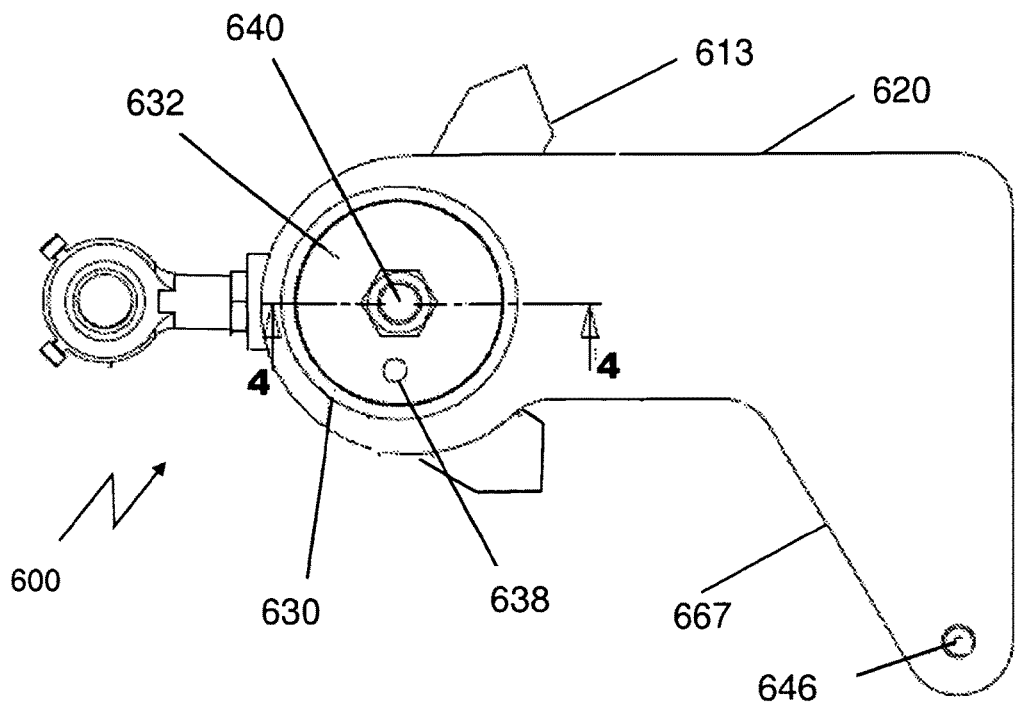
FIG. 7A is a plan view of the device in FIG. 6.
Figure 7B:
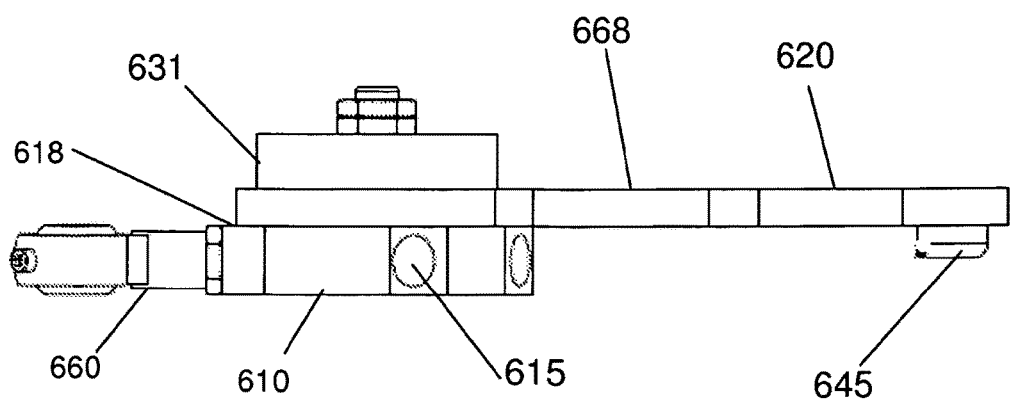
FIG. 7B is a side view of the embodiment of the device in FIG. 6.
Figure 8:
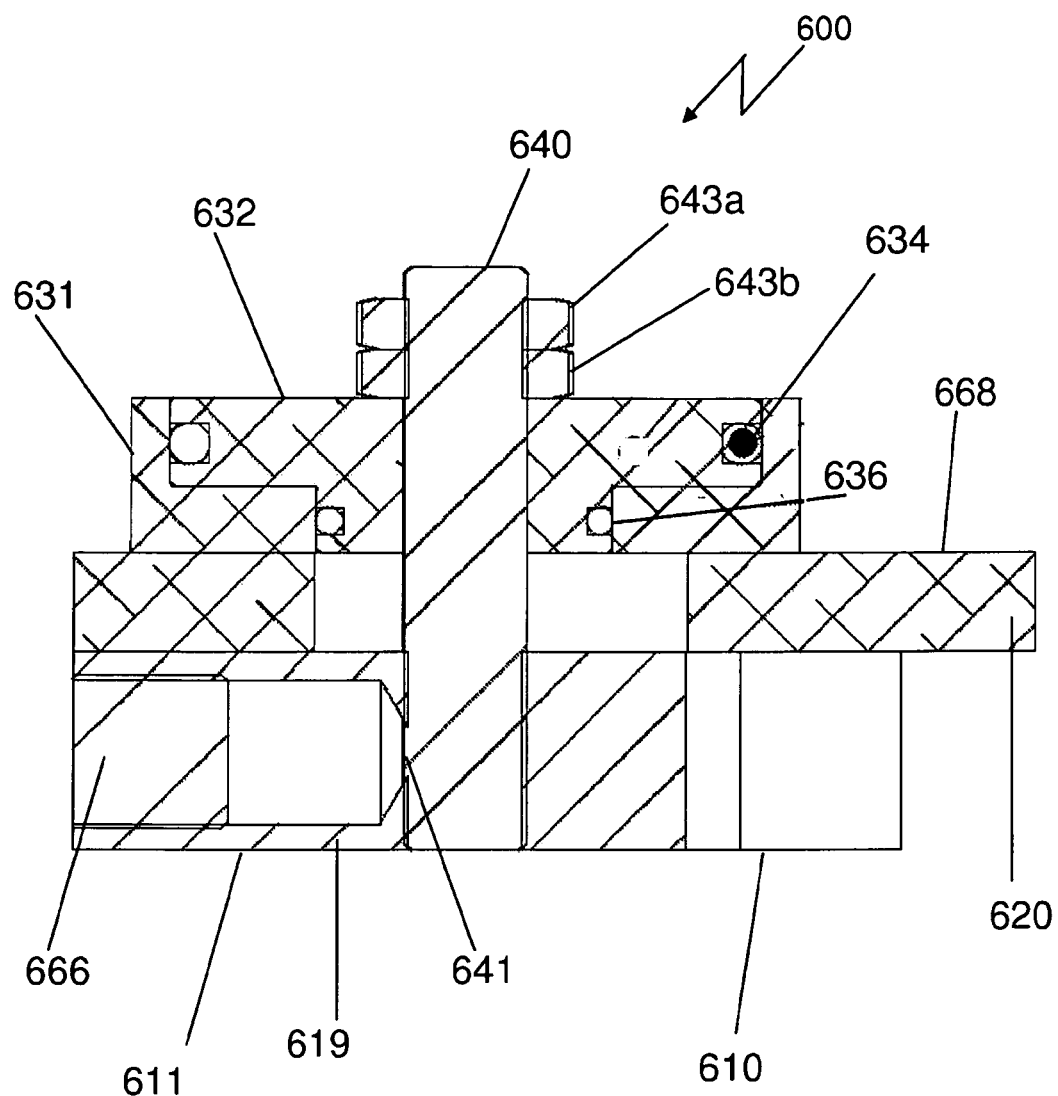
FIG. 8 is a cross-section along line 4-4 of FIG. 7A through the center of the device.

FIGS. 6 to 8 show additional embodiments of the device, without mounting feet, that may utilize alternative forms of attachment of the device to the structure that is being drilled or reworked, such as a g-clamp or similar mechanical device.

Figure 1:
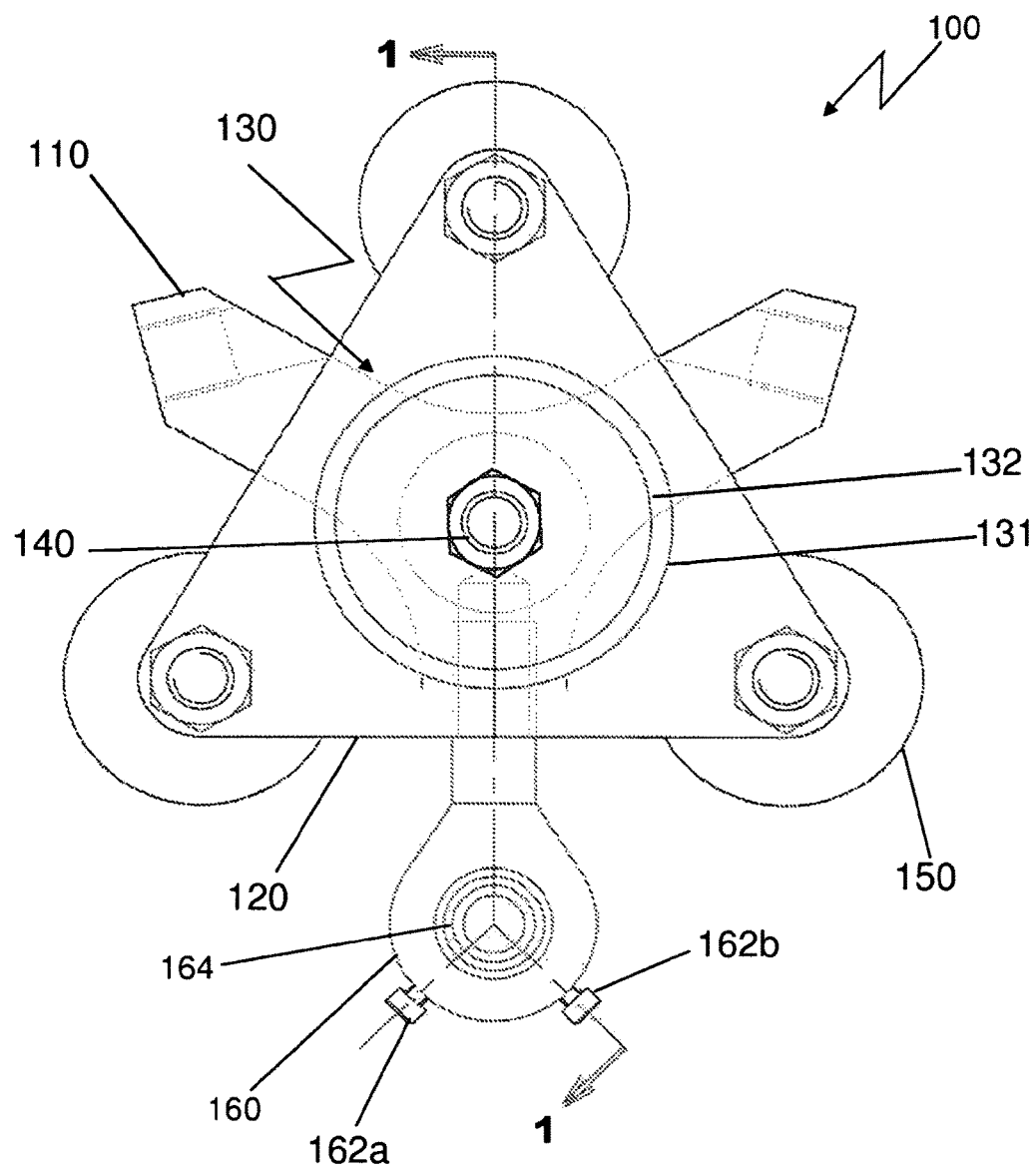
FIG. 1 is a top view of an alignment device for drilling and reaming fastener holes.

FIG. 1 shows a plan view of an alignment device 100 for use in drilling or reaming fastener holes on aircraft bodies. The device 100 comprises a positioning element, a base and a fixation element. These components are illustrated in exemplary form in FIG. 1 as a slider 110, a base plate 120 and a clamp mechanism 130, respectively. The slider 110, base 120 and clamp 130 are attached and aligned to each other through a central bore 141 by a central stud 140, central nut 143 and central washer 142 (illustrated in FIG. 2). To allow for the slider 110, base 120 and clamp 130 to be re-positioned and fixed relative to each other, they should have complementary engaging surfaces. For example, the base 120 may have a flat top surface and the clamp 130 may have a flat bottom surface, so that those flat surfaces can frictionally engage with one another when the clamp is pushed down against the base. Likewise, the base 120 may have a flat bottom surface, and the slider 110 may have a flat top surface, so that those flat surfaces can frictionally engage with one another when the base is pushed down against the slider by the clamp. The top surface of the clamp 130 and the bottom of the slider 110 may or may not be flat as these surfaces have a lesser effect on the ability of the clamp 130 to lock the main elements into position with one another.

A first fixation element is shown in FIG. 1, which may be embodied as a mounting unit 150, such as a vacuum clamp, in some embodiments. Utilizing the first fixation element, the device 100 can be firmly attached to the aircraft or other structure to be drilled or reworked. A locating pin 107 (FIG. 12) is placed in an alignment element 164 to allow the device 100 to be approximately aligned. The locating pin 107 is placed in the alignment element 164, and the positioning arm 160 and alignment mechanism arranged such that the locating pin 107 sits flush in the subject hole (the hole to be reworked). The locating pin 107 is not generally used to locate the entire device; it is primarily used for the specific aspect of aligning the positioning arm 160 and the alignment element 164.

The slider 110, which is free to move relative to the base 120 in a limited manner when they are not clamped together, is then adjusted to achieve the next level of positioning of the device, while the locating pin is still marking the hole to be drilled or reworked. When this position is achieved to an appropriate level of accuracy, the second fixation element (i.e. clamp 130) can be activated, for example by a pneumatic activation switch 102, to lock the base 120 and slider 110 rigidly to one another.

Figure 2:
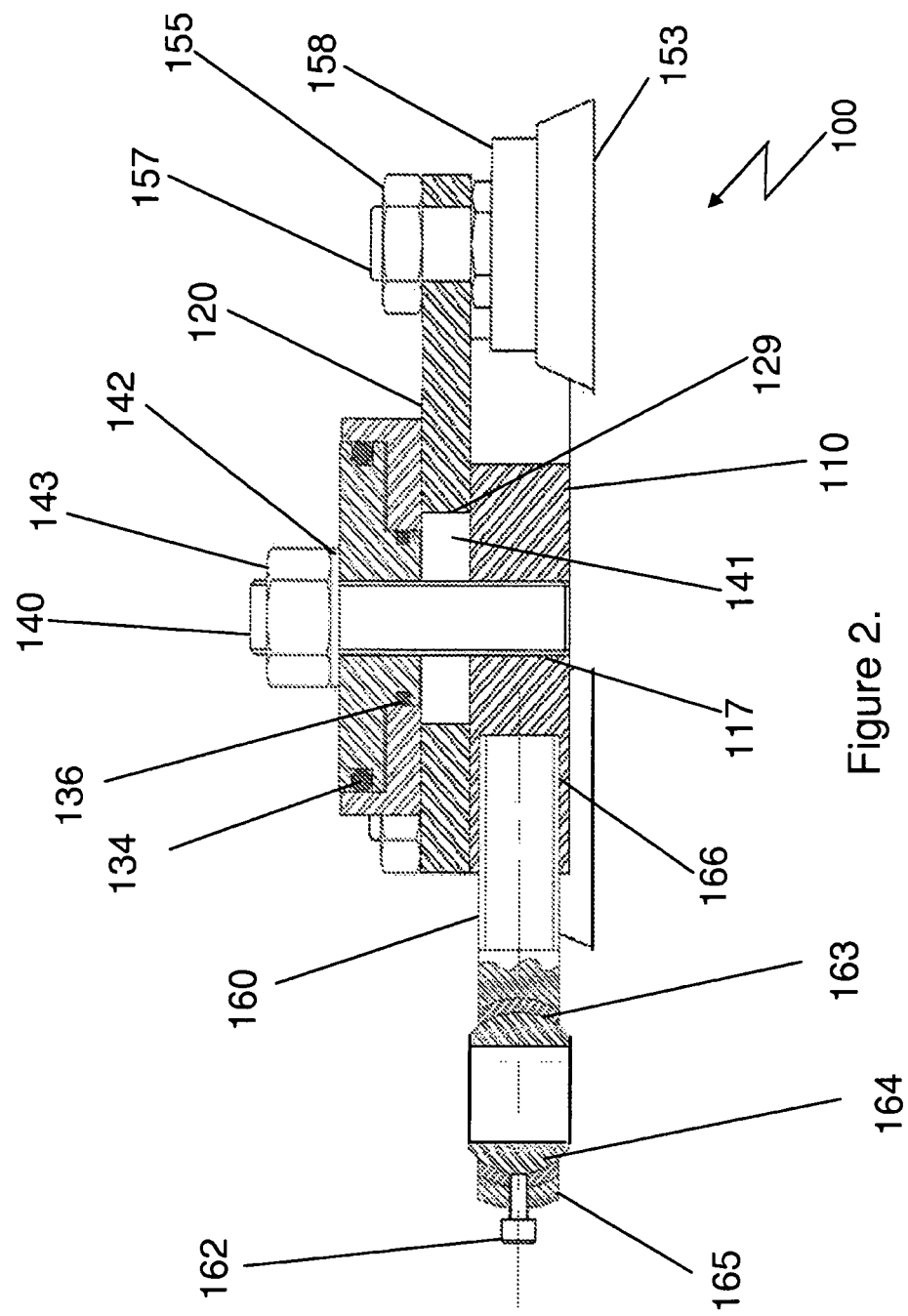
FIG. 2 is an offset cross-sectional view along line 1-1 of FIG. 1, through the center of the device and the center of a positioning arm of the device from FIG. 1.

Again using the locating pin 107 (FIG. 12), the device 100 is further aligned to a hole to be drilled or reamed to a high degree of accuracy using the alignment element 164. The alignment element 164 may be formed as a frusto-spherical ball with a central bore therethrough that is free to rotate within a bushing, such as a bronze bushing 163 (FIG. 2). The alignment element 164, once in position, can be locked using another fixation element, such as one or more manually operable fixation devices which may be, for example, cap screws 162a and 162b.

FIG. 2 shows the internal elements of the device 100 as a cross-section through line 1-1 of FIG. 1. These elements are employed in the fine-tuning of positioning the device 100.

Once the device 100 is fully positioned and aligned on the surface of the structure to be reworked, the locating pin 107 is removed and the alignment element 164 may be fitted with an appropriate guide bushing 161 (FIG. 12) to guide a reaming tool 108 (FIG. 12) or drilling tool (not shown). The guide bushing 161 may be installed to reduce the size of a hole through the alignment element 164. The guide bushing 161 has a T-shaped cross-section, with a circular flange around the top edge that sits on top of the alignment element 164. The guide bushing 161 is a consumable used with the reaming tool 108 and is generally custom made. It is generally used in conjunction with reaming tools and therefore each size of reamer has a corresponding guide bushing 161.

Figure 9:
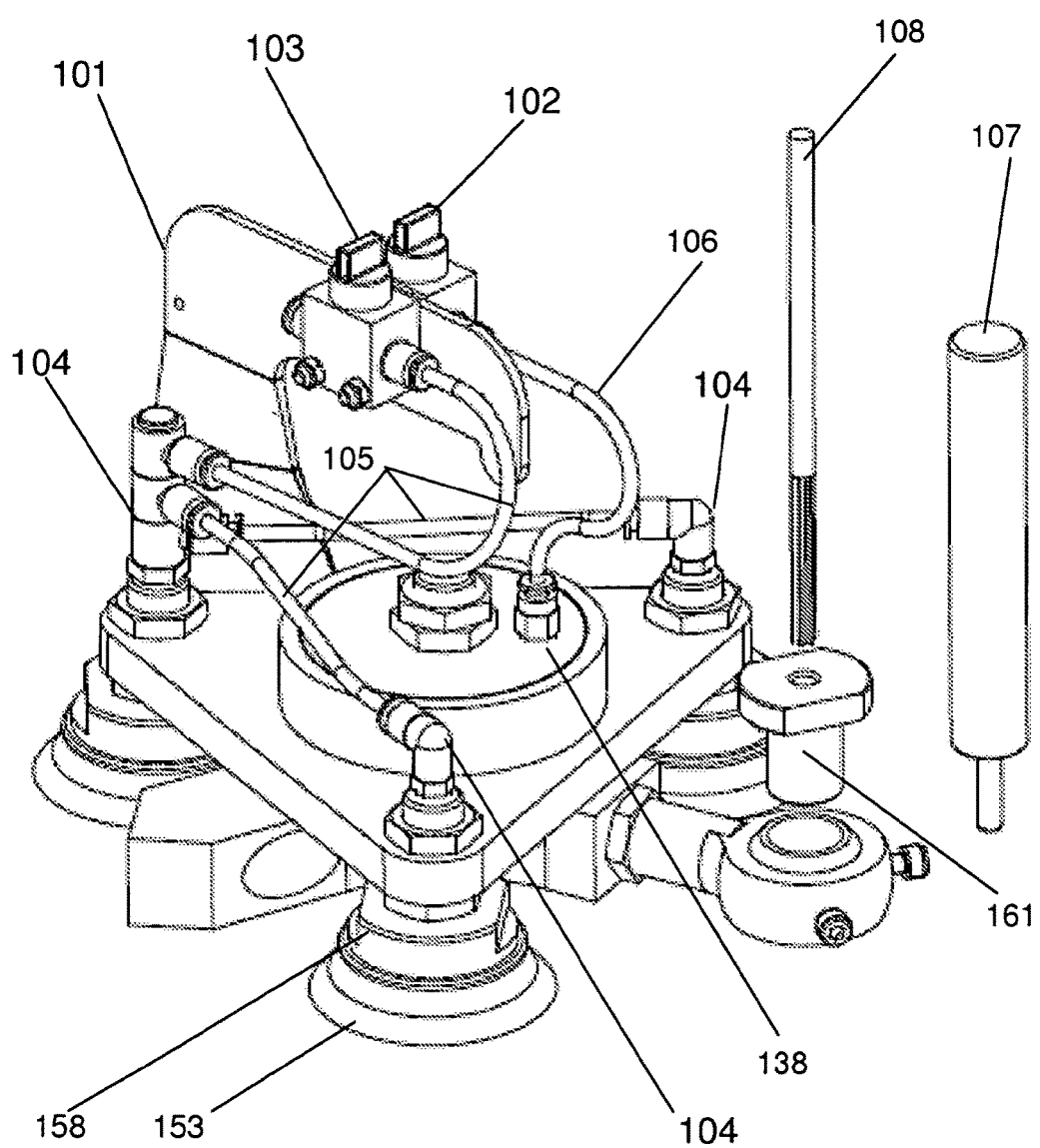
FIG. 9 is an embodiment of the device of FIG. 1 with a handle and pneumatics assembled to the handle.

The base 120 provides the main support for the device 100 wherein the slider 110 is located on one side of the base 120 and the clamp 130 is located generally on the opposite side of the base 120. When the clamp 130 is activated, for example by pneumatic switch 102 (FIG. 9), positive air pressure is applied via pneumatic hose 106 (FIG. 9) to the clamp 130, communicating to the clamp housing 131 via a pneumatic inlet/outlet port 138 (FIG. 9). This applied pressure is used to activate the clamp 130, frictionally engaging the base 120 and slider 110 to resist movement of the base 120 with respect to the slider 110 or vice versa. The clamp 130 may comprise a clamp piston 132 (FIG. 3A) and a clamp housing 131 (FIG. 4A).

The clamp piston 132 may be configured to utilize a short stroke to accomplish its locking position. The minimum length of stroke necessary will be that sufficient to overcome the clearance between the slider 110 and the base 120 and effect frictional engagement.

Figures 5A, 5B, 5C:
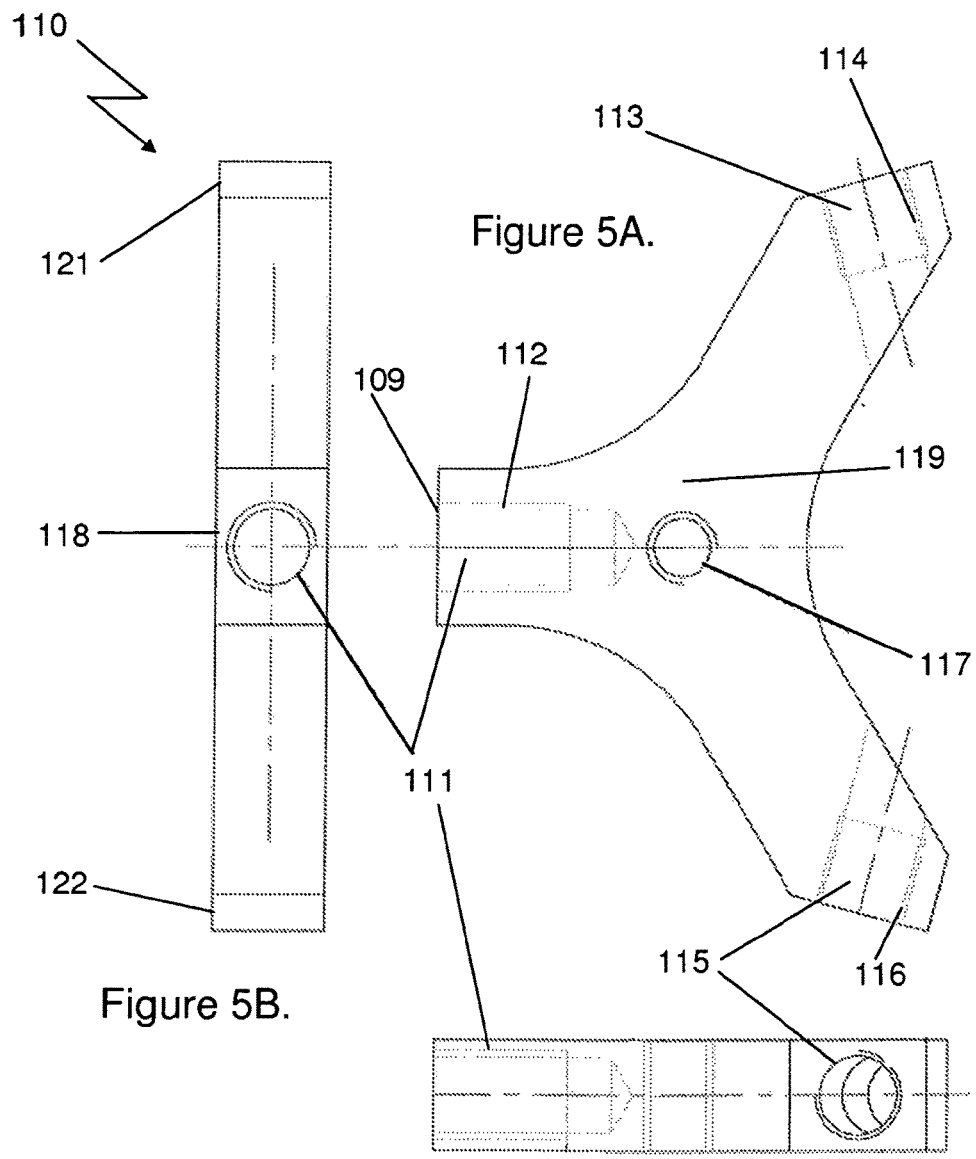
FIG. 5A is a top view of a slider (or positioning element) of the device in FIG. 1.
FIG. 5B is a front view of a slider and a primary positioning arm mount location.
FIG. 5C is a side view of the slider and an auxiliary positioning arm mount location.

The main elements of device 100 are centered and arranged around a central stud 140, with the stud 140 passing through an internal bore in the clamp 130 and base 120. The distal end of the central stud 140 is screwed into a threaded central bore 117 of the slider 110 (FIG. 5A). The base 120 and clamp 130 are then held captive on the central stud 140 by a central nut 143. When the clamp 130 is activated, for example by actuating the switch 102 on a handle 101 (FIG. 12), the clamp piston 132 is biased away from the clamp housing 131 (by the air pressure differential) and the slider 110 is abutted tightly up against the base 120.

In some embodiments, the base 120 is a triangular shaped plate that carries three peripheral fixation elements, positioned near each apex of the triangle, to affix the base 120 to the structure to be drilled or reamed. In some embodiments, these first fixation elements are represented as mounting units 150. The mounting units 150 may use suction to attach and stabilize the device 100 to the structure containing the holes to be reworked. The mounting units 150 are comprised of three main components, a mounting unit body 158, a vacuum cup 153 and a central clamp lock stud 157. A vacuum hose 105 (FIG. 9) extends to each mounting unit 150 that delivers vacuum pressure simultaneously to each of the three vacuum cups 153. The vacuum pressure may be controlled by a switch 103 (FIG. 9) which may be mounted on the handle 101 (FIG. 9) of the device 100 or the base 120. In alternative embodiments, the mounting units may employ magnetic coupling means to couple the device 100 to the structure to be drilled or reamed.

The vacuum hoses 105 may couple to the mounting units 150 from a pneumatic connection point 104 (FIG. 9) at the top of the vacuum clamp stud 157. The vacuum pressure is communicated from the hose 105, via the vacuum duct 154 to the vacuum cup 153. The vacuum clamp stud 157 provides the attachment mechanism for the mounting unit 150 to the device 100, which is secured by mounting unit lock nut 155, in addition to the vacuum delivery duct 154 (FIG. 10C) for the vacuum pressure. The mounting unit body 158 has a squat cylindrical configuration, with a flat top surface that may mate closely to the underside of the base 120.

The vacuum cup 153 may be elastomeric and have a flared or frusto-conical shape that is open at the base and can provide a generally air-tight seal to the mounting unit body 158 at its top surface. When the device 100 is placed in close contact with an aircraft skin, the vacuum cups 153 can be manually pressed up against the aircraft skin. This pressing may push out some of the air within the vacuum cups 153. The vacuum pressure is then applied and the remaining air is reduced or removed from the vacuum cups 153, thereby forming a tight seal that is sufficient to retain the device 100 on the surface of the aircraft until the vacuum pressure is deactivated through the switch 103.

The mounting units 150 are located on the underside of the base 120 and face away from the clamp 130. The individual mounting units 150 are bolted to the base 120, and upon activation of each mounting unit 150, the respective vacuum cup 153 is depleted of air and a vacuum suction is created in all mounting units 150 simultaneously. A system of vacuum hoses 105 is used to connect the at least one mounting unit 150 to the pneumatic connection point 104 and vacuum switch control 103, which may be mounted on the base 120 of the device 100 or on a separate handle structure 101. This pneumatic fix and release mechanism allows the device 100 to be removably affixed to the structure at any location, regardless of whether the area of rework is horizontal, vertical or underneath the main wing or fuselage of the aircraft or other structure.

As the pneumatic control 102 and vacuum control 103 may be easily applied, and react in a matter of seconds or fractions of a second, the device 100 may easily be positioned and repositioned in order to achieve the best results.

Depending on the weight and scale of the device 100, as well as the power of the vacuum cups, as few as one mounting unit 150 may be required, however multiple mounting units 150 may be employed to support and mount heavier devices. In some embodiments, each vacuum cup 153 creates approximately 10-14 psi.

The base 120 has a central internal wall 129, which is circular in configuration and defines a central bore 141. The central bore 141 may be oversized in comparison to the central threaded bore 117 of the slider 110 to allow for increased relative adjustment between the slider 110 and base 120 when the device 100 is being positioned for use.

The positioning arm 160 of the device is coupled to and located partially within a mounting portion 111 of the slider 110. The slider 110 is shown and described in further detail in FIGS. 5A, 5B and 5C.

FIG. 5A illustrates a plan view of the slider 110, which comprises a central portion 119 and three limbs. The top and bottom surface of the slider 110 are shown in this embodiment to be flat, as illustrated in FIG. 5B. The top surface must be capable of mating to the underside of the base 120 when the clamp 130 is activated, to ensure that sufficient pressure is applied to lock the slider 110 in position relative to the base 120. The outward facing surface of the base of the slider 110 is not required to mate with the underside of the base 120 and may be curved or rounded or profiled to adapt accordingly to a specific structure.

The slider 110 may comprise primary 118, secondary 121 and tertiary 122 limbs, extending from a central section 119 in an evenly spaced three pronged configuration. The secondary 121 and tertiary limbs 122 are optional and one or both may be omitted from some embodiments. The length and shape of the primary limb 118 is shown in FIG. 5A to be shorter than that of the secondary limb 121 and tertiary limb 122 and has a rectangular profile when viewed in plan view. The end surface 109 of the primary limb 118 is flat and has a threaded hole drilled therein as a primary positioning arm mount point 111. The first section of the positioning arm mount 111 is threaded 112 to allow the positioning arm 160 to be screwed into position using a mating screw-threaded portion.

The secondary limb 121 and tertiary limb 122 of the slider 110 may be of equal length and similar shape in some embodiments. However, depending on the structure to be reworked, the secondary limb 121 and tertiary limb 122 may be of different lengths and different configurations, offering additional flexibility and access to different holes to be reworked on different structures.

At the end of the secondary limb 121 there is a secondary mounting location 113 for the positioning arm 160, which also has a partially threaded portion 114 to fix the positioning arm 160 in place. The surface of the secondary limb 121 at mounting location 113 may not be square to the secondary limb. This means that the mounting direction for the secondary positioning arm mount 113 may not be into the end of the limb 121 (longitudinally, as with the primary mount 111) but instead through (or partially through) the limb 121. The third limb 122 of the slider 110 has a tertiary mounting point 115 for the positioning arm 160, which also has a partially threaded portion 116. Similar to that of the secondary limb 121, the tertiary limb 122 may not have a squared end. The tertiary mounting position 115 for the positioning arm 160 may therefore not be into the tertiary limb 122 but through the limb 122. These locations for alternative mounting points 113 and 115 allow for a wide range of adjustments while using the device 100, facilitating the accurate positioning and rework of a maximized number of holes within the structure. For more variations, the slider 110 may be produced with limbs in excess of three, to deliver additional flexibility and mounting locations to provide for a specific structure.

When a mounting unit 150 is activated, the slider 110 is pulled towards the surface of the structure to be reworked, but is designed to avoid contact with the surface of the structure. Any form or projection on the underside of the slider 110 is limited in length and does not extend past the plane of the rigid structure of the mounting units 150, so as not to mark or damage the outer surface of the structure being reworked. The limitations on the permitted length of any such projections will be dependent on the size and depth of the vacuum cup 153 in its pressurized configuration, and on the expected curvature of the surface to be worked on.

The positioning arm 160 is shown in FIG. 2 coupled to the primary limb 118 of the slider 110. The proximal end 166 of the positioning arm 160 may be threaded and screwed into the slider 110 so as to become removably affixed, as shown in more detail in FIGS. 11A, 11B and 11D. The proximal end 166 may not extend into the slider 110 as far as the central threaded bore 117, but stops short of where the end of the positioning arm mounting point 111 becomes unthreaded. The distal end 165 of the positioning arm 160 as shown in detail in FIGS. 11A, 11B and 11D, has an annular end-piece with two spaced cap screws 162a and 162b partially threadedly received therein. The distal end 165 of the positioning arm 160 defines an aperture in which the alignment element 164 and guide bushing 161 may be located.

The positioning arm 160 is made from steel in some embodiments but may be manufactured from various materials, depending on design preferences for strength, weight and working conditions. For example, an aluminum, or magnesium alloy may provide weight savings.

The alignment element 164 is located in the annular distal end 165 of the positioning arm 160. In some embodiments, the alignment element 164 may comprise a frusto-spherical ball mounted in a seat of complementary shape defined by the distal end 165 of the positioning arm 160. In the embodiment depicted in FIGS. 11A, 11B, 11C and 11D, the spherical shaped alignment element 164 is of a cropped spherical shape, defining opposed flat annular surfaces. The alignment element 164 defines a central bore that extends in an axial direction perpendicular to a plane of the opposed flat annular surfaces, to allow the guide bushing 161 to be inserted into the alignment element 164 for use to guide the drilling tools or reaming tool 108 necessary for the reworking of the structure.

The alignment element 164 may alternatively be received by a suitably shaped bushing, sandwiched between the alignment element 164 and the distal annular portion at the distal end 165 of the positioning arm 160. As the alignment element 164 is adjusted and pivoted within the distal end 165 of the positioning arm 160, the alignment element 164 and the distal end 165 of the positioning arm 160 may grate against one another. This abrasive motion between the two components may increase the rate at which the joint deteriorates and the connection may loosen or become damaged. To address this potential issue, a bronze bushing 163 may be placed between the two components. The bronze bushing constitutes a relatively soft material and softens the joint, by reducing the abrasive forces between the two components.

The joint configuration between the alignment element 164 and the positioning arm 160 allows for movement and precise alignment in all rotational degrees of freedom, thus completing the alignment operation of device 100. Once positioned, the device 100 facilitates use as a guide for the reworking of fastening holes in the structure. The orientation of the alignment element 164 is held in position by one or more fixation elements 162, illustrated in the Figures as a pair of spaced cap screws 162a and 162b extending through material of the distal end 165 to adjustably abut the alignment element 164. These can be manually tightened or released to facilitate multiple adjustments where necessary and provide a frictional locking mechanism once the alignment element 164 is in the desired location.

As seen in FIG. 1, the clamp 130 comprises two main components: a clamp housing 131 and a clamp piston 132. When positive pneumatic pressure is applied to the clamp 130 (from a source of pressurized air, not shown), the piston 132 is forced to move upwards out of the clamp housing 131, pulling the upper surface of the slider 110 onto the lower surface of the base 120, effectively locking the three central components of the device 100 into position relative to one another by frictional engagement of the two parallel (and planar) surfaces with each other.

Figure 3A:
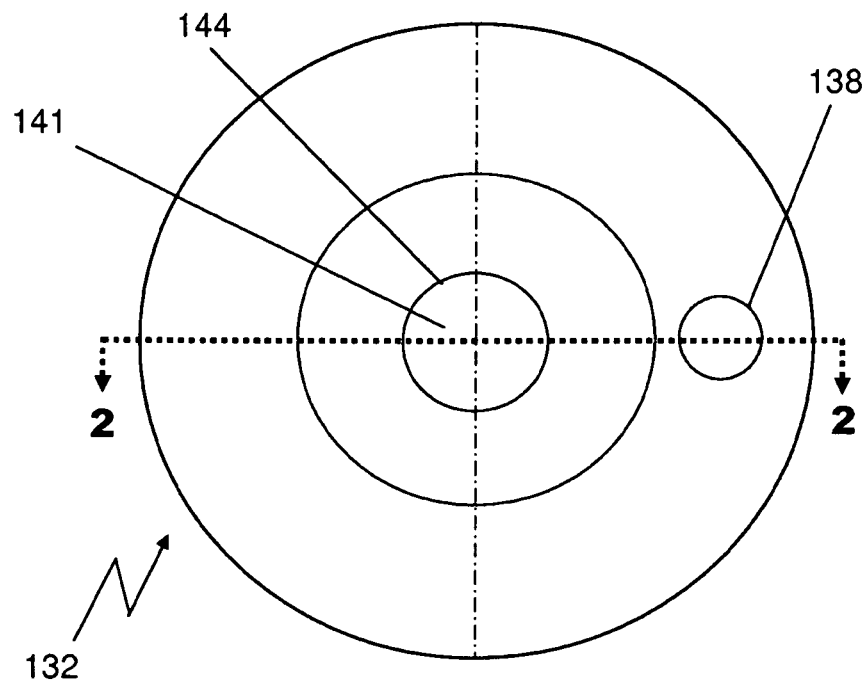
FIG. 3A is a cross-section through a clamp piston (or secondary fixation device)
Figure 4A:
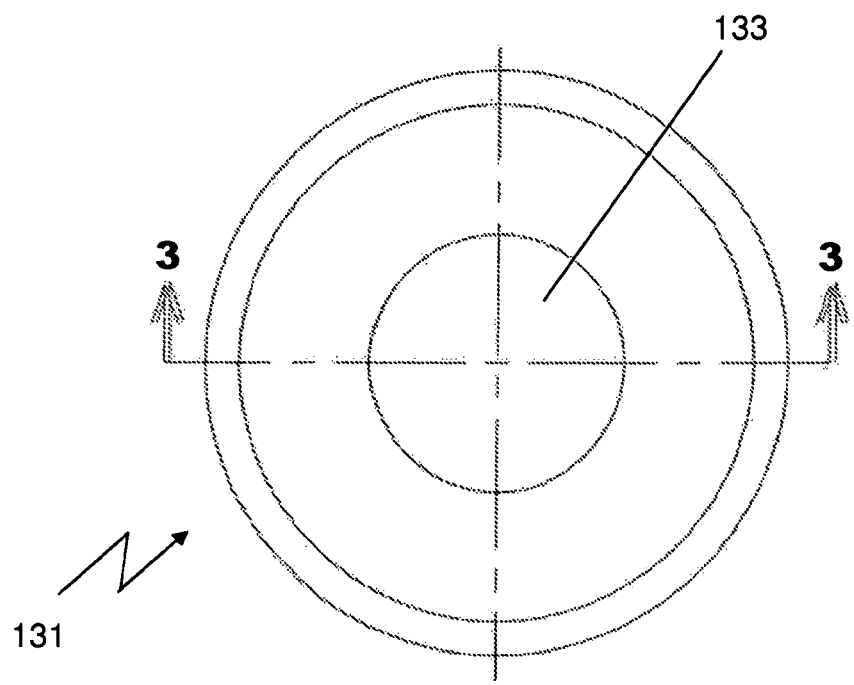
FIG. 4A is a top view of a piston clamp housing (lower portion of a secondary fixation device)

The clamp piston 132 is shown in detail in FIG. 3A, which shows a circular internal wall 144 located in the center of the piston 132 when viewed in a plan view. The circular wall 144 defines an internal bore 141 through the center of the piston 132. This bore 141 is used to align the piston 132 and the housing 131 with each other and with the slider 110 and the base 120 of the device 100.

The device 100 may be designed to work on approximately 100 psi pneumatic pressure as found commonly in many workshops with central pneumatic systems for air tools. This parameter is easily adjusted through standard engineering mechanisms and the device 100 can then be used on a wide range of differing pneumatic pressure systems. The vacuum system for the device 100 may be driven by a vacuum generator or by using an in-line venturi pump on a standard pneumatic system.

Figure 3B:
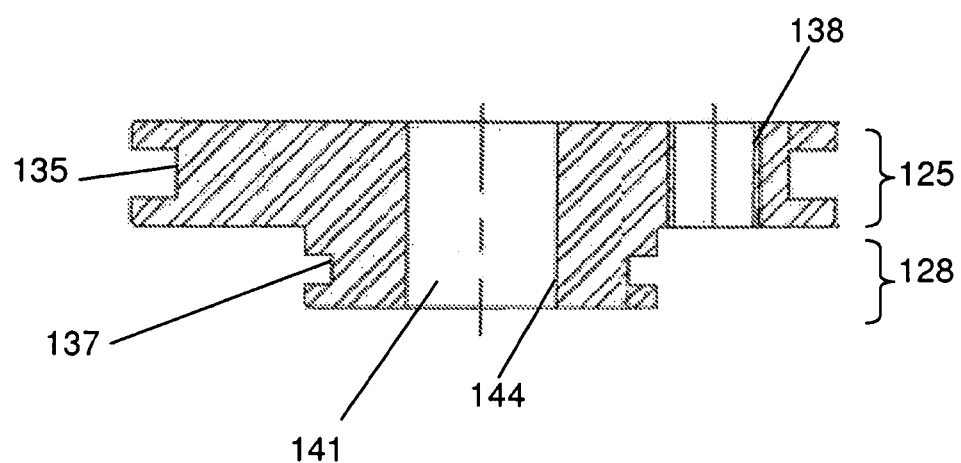
FIG. 3B is a top view along line 2-2 of FIG. 3A of the clamp piston and shows the relative locations of a central bore and a pneumatic inlet/outlet.

FIGS. 3A and 3B show the location of the pneumatic inlet/outlet 138 which passes through the upper section 125 of the piston 132. The pneumatic inlet/outlet 138 is positioned toward the perimeter of the piston's top surface and is horizontally aligned with the central bore 141. The inlet/outlet 138 extends through the upper piston section 125 at a position radially between the outer radius of the lower piston section 128 and the outer o-ring seal recess 135. The inlet/outlet 138 is positioned such that fluid flow into the clamp 130 enters an enclosed volume, bounded by the housing 131 and the piston 132, and sealed by the outer clamp o-ring seal 134 (FIG. 2) and the inner clamp o-ring seal 136 (FIG. 2).

FIG. 3B shows the piston clamp 132 from FIG. 3A in cross-section taken along line 2-2. The piston 132 has two distinct portions, an upper portion 125 and a lower portion 128. The upper portion 125 is that closest the top of the clamp 130 and is of a larger diameter than the lower portion 128 that is located within the clamp housing 131. The upper portion 125 may be about twice the diameter of the lower portion 128, although this ratio may be varied depending on the required pressure and any size limitations on the overall device 100. The central bore 141 passes through both the upper portion 125 and the lower portion 128 of the piston 132. However, the pneumatic inlet/outlet 138 passes from the top face of piston 132 through only the upper portion 125, thus ensuring a passage through the piston 132 into the clamp 130 for the pneumatic pressure to be applied.

Figure 13A:
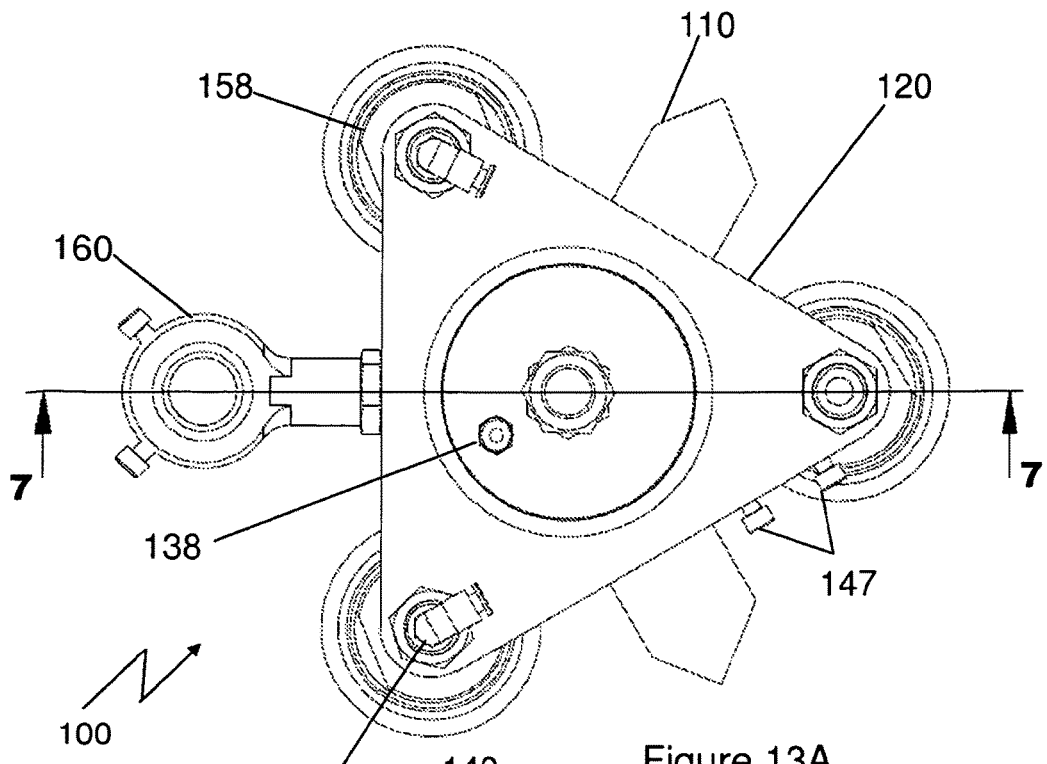
FIG. 13A is a top view of the device of FIG. 9, showing pneumatic connection points.
Figure 13B:
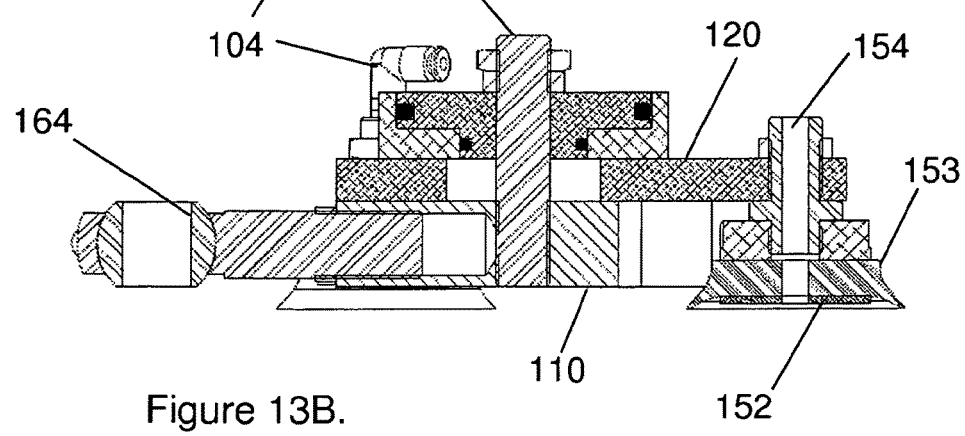
FIG. 13B is a section along line 7-7 of FIG. 13A through the center of the device.

Two recesses are formed circumferentially around the clamp piston 132 to locate and house two seals, shown as o-ring seals 134/136 in FIGS. 2 and 13B. In an outer wall of the upper portion 125 there is a recess 135 for the housing and location of an o-ring seal 134 with a diameter similar to the diameter of the upper piston 125. The recess 135 may be approximately centrally positioned along the outer wall of the upper portion of the piston 125, as shown in FIG. 3B. The lower portion 128 of the piston 132 also has a recess 137 in the outer piston wall for the location and housing of a smaller diameter o-ring seal 136. The recess 137 may be located approximately centrally in the lower portion of the piston 128. Both the large and the small o-ring seals 134/136 ensure that a tight seal is maintained between the clamp piston 132 and the clamp housing 131 when the pneumatic pressure is applied through inlet/outlet 138.

When the positive air pressure within the clamp 130 between the clamp piston 132 and the clamp housing 131 is applied, the clamp piston 132 is pushed upwards and the slider 110 is tightly frictionally engaged with the base 120. The range of relative movement between the slider 110 and the base 120 is limited by the abutment of the central stud 140 against the internal wall 129 but may be in the order of about 1 mm, for example. This frictional locking mechanism is entirely reversible on reducing the pressure to clamp 130 by adjusting switch 102, thus releasing the pressure through aperture 138. This allows for repeated adjustment and readjustment of the device 100 if and when required.

FIG. 4A shows a plan view of the clamp housing 131, which has an essentially cylindrical configuration. The housing 131 has a central bore 133, through which the central stud 140 extends. The central stud 140 allows the clamp housing 131 to be aligned and attached to the piston 132, base 120 and slider 110.

In some embodiments, the housing 131 is made from an aluminum or aluminum alloy to minimize the weight of device 100. Other materials may be utilized, provided they are strong enough to maintain the necessary pressure to enable clamping of the base 120 and slider 110.

Figure 4B:
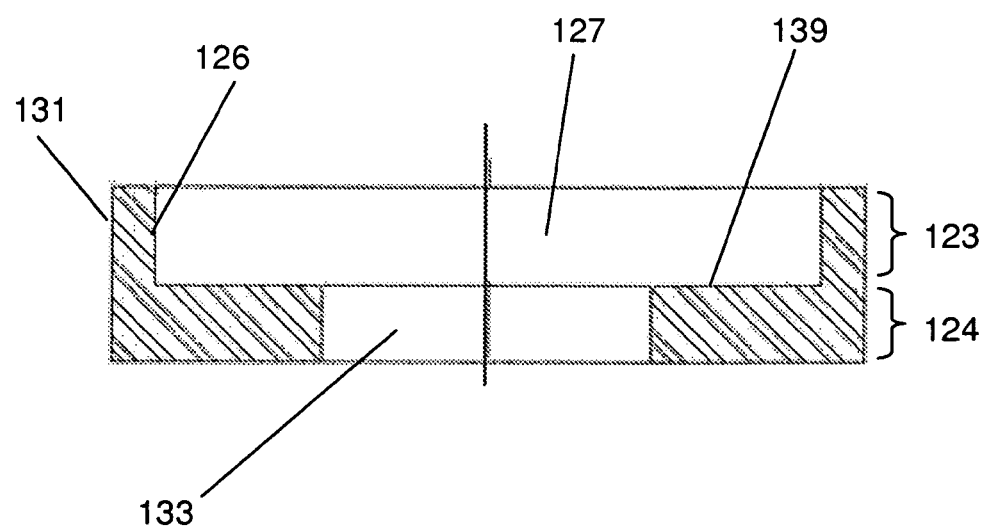
FIG. 4B is a cross-section along line 3-3 of FIG. 4A through the piston clamp housing.

FIG. 4B shows a cross-sectional view taken through line 3-3 of FIG. 4A through the clamp housing 131. The clamp housing 131 has an upper portion 123 and a lower portion 124. The upper portion 123 has a large cylindrical bore, almost as large in diameter as the housing 131 itself. The internal wall 126 in the upper portion 123 is configured to form bore 127 that receives the upper portion 125 of the piston 132. At the base of the bore 127, the housing 131 forms a piston seat 139, on which the piston 132 may sit when no pneumatic pressure is being applied via switch 102. When pressure is applied, the piston 132 will be pushed away from the piston seat 139, until the slider 110 is pushed against the lower surface of the base 120 and frictional engagement will retain the device 100 in this configuration during its intended use. The stroke of the piston 132 should be at least the length of the air gap between the slider 110 and base 120, when no pneumatic pressure is being applied.

The lower portion 124 of the housing 131 also has a central bore 133 that is approximately the same (but slightly larger) diameter as the lower portion 128 of the piston 132. The lower part of the piston 132 sits within the bore 133 of the housing 131 and the inner (smaller) o-ring 136 forms a seal between the piston 132 and housing 131. Within the upper portion of the housing 123, which has an internal bore 127 diameter approximately equal to (but slightly greater than) the outer diameter of the upper portion 125 of the piston 132, there is an outer o-ring 134 which maintains the seal between the piston 132 and housing 131 in the upper portions 125/123. The outer o-ring 134 may be approximately twice the diameter of the inner o-ring 136, and may have a larger cross-sectional area.

FIGS. 6 to 8 show an alternative embodiment of the device 600. Similar to the arrangements described in relation to FIGS. 1 to 5, a slider 610 is mounted on one side of a base 620, and on the opposite side of the base 620 is a clamp 630. A positioning arm 660 is mounted to a primary limb 618 of the slider 610 and is similar to the embodiment shown in FIG. 1. An alignment element 664 is located within a distal end 665 of the positioning arm 660. Device 600 comprises a base 620 which may be more suitable for use on particular aircraft structures. FIG. 6 also illustrates alternative mounting points for the positioning arm 660, as a secondary mounting point 613 and tertiary mounting point 615. The base 620 has no mounting units attached to it and relies on a different first fixation element. The first fixation element in this embodiment comprises an elongate plate forming part of the base 620 that extends away from the positioning element or slider 610 and is designed to be clamped to the structure using a g-clamp or similar mechanical device (not shown).

In FIG. 6, the base 620 is shown as an elongate, flat plate, with a foot 667 at the end furthermost from the clamp 630. At an apex of the foot there is a stabilizer boss 645. This boss 645 may be produced from nylon or other suitable material, such as a stiff elastomer. The stabilizer boss 645 must be strong enough to support the foot end 667 of the base 620 without deforming too much. The boss 645 is constructed to not cause any damage to the structure where it is supporting the device 600.

In FIG. 7A, the device 600 can be seen in plan view and the mounting point of the stabilizer boss 645 can be seen on the top surface of the base 620. The stabilizer boss 645 offers an additional point of support (along with a g-clamp or similar mechanical device) to ensure that the device 600 is stable and steady when being used to guide the drilling and reaming of fastener holes in an aircraft structure. In various embodiments, the stabilizer boss 645 may be modified in length and width and shape in order to provide the necessary support for the device 600 depending on what structure is being reworked and the specific location on the structure that is being reworked. Device 600 may comprise more than one stabilizer boss spaced across foot 667.

FIG. 7B illustrates a side view of some embodiments of device 600. The positioning arm 660 is located in the primary limb 618 of the slider 610. In the center of FIG. 7B, a tertiary mounting location 615 is shown. The stabilizer boss 645 may be of a cylindrical configuration with a chamfered or rounded end. As the stabilizer boss 645 is intended to be used to transfer load into the structure, the surface of the boss 645 in contact with the structure should not be sharp or pointed, thereby minimizing the potential to damage the structure. In FIG. 7B, the stabilizer boss 645 is shown mounted underneath the base 620 where it does not protrude from the base 620 as far as the slider 610. This is because the boss 645 is designed to stabilize the device 600 when sitting on a curved surface of a structure to be reworked. Unlike the embodiment of device 100 shown in FIG. 1, embodiments of device 600 are designed to be mounted to a surface out-of-plane to the rework surface, allowing the slider 610 to sit below the lowest rigid component of the at least one first fixation element. The length of the foot 667 may be varied in different embodiments to suit different structures or even different parts of the same structure.

Between the stabilizer boss 645 and the clamp 630 is the clamping surface 668 of the base 620. The clamping surface 668 may be a flat surface designed for the attachment of a g-clamp or similar mounting mechanism. It is however contemplated that some surface variation could be integrated into the base 620, in this area, to improve the clamping surface 668 contact with the chosen clamp. Mounting point 646 is where the stabilizer boss 645 is screwed or otherwise affixed to the base 620. This mounting point may allow a modicum of adjustment of the stabilizer boss 645, for example by screwing the stabilizer boss 645 in or out of the base 620. The stabilizer boss 645 can also be replaced by variants with different dimensions to better suit the rework site on the structure.

FIG. 8 shows a cross-sectional view of the device taken along line 4-4, through the center of device 600, as seen in FIG. 7A. Section 4 extends from a proximal end 666 of the positioning arm 660 through the center of the clamp housing 631 to a position on the clamping surface 668 of the base 620. A similar configuration is shown to that in FIG. 2, with some marked differences as described below.

As shown in FIG. 8, the positioning arm mount 611 extends through the primary limb 618 and the center portion 619 of the base 620. FIG. 8 clearly shows the clamp piston 632 in the clamp housing 631 and the outer o-ring seal 634 and inner o-ring seal 636 used to maintain the seal when the clamp 630 is activated. The base 620 is shown in an off-center position relative to the clamp 630 and the slider 610, where the slider 610 has been positioned to align with a hole to be reworked, and the clamp 630 has been activated to lock the device 600 in these relative positions. In this embodiment, two nuts 643a and 643b may be used to secure the central stud 640 in position.

FIG. 9 illustrates the device 100 with all vacuum hoses 105 and pneumatics fully assembled to a handle 101. The handle 101 may be cut from a flat piece of aluminum sheet, although other material may be used. The handle 101 may then be bolted or affixed to the base 120 in a convenient manner. In one embodiment, the handle 101 is attached to the base 120 by two screws 147 (shown in FIG. 13A).

Affixed to the top of handle 101 are two valve switches: switch 103 controlling the vacuum to the mounting units; and switch 102 controlling the pneumatics to the clamp 130. One of the vacuum hoses 105 extends from the vacuum switch 103 to a pneumatic connection point 104 that is located directly above, and in communication with, the vacuum duct 154 of one of the mounting units 150. From a first pneumatic connection point 104, additional vacuum hoses 105 extend out to any additional pneumatic connection points 104, communicating pressurized air to any additional mounting units 150. The connection of hoses 105 may be such that the suction effect of each mounting unit 150 will be activated within seconds or fractions of a second of activating vacuum switch 103, and if multiple mounting units 150 are employed, they will all activate contemporaneously.

FIG. 9 shows switch 102 mounted to the handle 101 adjacent to switch 103. This configuration maximizes the amount of handle 101 that may be utilized for gripping to manipulate the position of the device 100. However, the two switches 102/103 need not be mounted in close proximity. Switch 102 is used to activate positive pneumatic pressure to the clamp 130, which is transferred through hose 106 and into the top of the clamp piston 132 via pneumatic inlet/outlet 138. The hose 106 must be sufficiently long to pneumatically connect switch 102 to outlet 138, allowing for the stroke of the clamp piston 132, however excess hose 106 length may be cumbersome in operational use of the device 100.

FIG. 10A shows a detailed side view of a mounting unit 150. The mounting unit 150 may be made from a commercial vacuum pad, shown here as Model ZPT63, manufactured by SMC Pneumatics. When the Model ZPT63 is used, it initially comprises standard 4 mm cap screws. In the embodiment shown in FIGS. 10A, 10B and 10C, these screws have been removed from the unit 150 and replaced with an aluminum disc 152 of about 2 mm thickness. Disc 152 has a central hole and is fitted using two countersunk-head cap screws 151*a* and 151*b*. The disc 152 forms a more rigid foot for the mounting unit 150, which is then capable of carrying shear loads. The disc 152 may be faced with a fine-grit, abrasive, paper using double-sided adhesive tape, thus creating a higher-friction surface. The purpose of this modification is to form a more frictionally engaging base for the mounting unit 150.

FIG. 10B shows a top view of the mounting unit 150. The clamp stud 157 is shown in the center of the unit 150 and surrounds the vacuum duct 154 that allows the vacuum pressure to be communicated through the mounting unit 150 to create a vacuum in the vacuum cup 153. A clamp lock nut 159 is used to secure the stud 157 to the mounting unit 150. To affix the mounting unit 150 to the base 120, the stud 157 extends through an aperture at a required location on the base 120 and a mounting unit lock nut 155 is used to secure the mounting unit 150.

FIG. 10C shows a cross-sectional view through the mounting unit 150 taken along line 5-5. The vacuum duct 154 extends through the mounting unit body 158 and communicates negative air pressure to the vacuum cup 153 through an aperture in the aluminum disc 152 within the top section of the vacuum cup 153. The counter-sunk cap screws 151*a* and 151*b* are shown symmetrically positioned on either side of the vacuum duct 154. The countersunk cap screws 151*a* and 151*b* are inserted from the underside of the mounting unit 150 and extend into the mounting unit body 158; however, they do not protrude from the body 158.

The vacuum system used to activate the mounting units 150 may be driven by a vacuum generator or by using an in-line venturi pump on a standard pneumatic system.

FIGS. 11A, 11B, 11C and 11D illustrate some embodiments of the positioning arm 160. The alignment element 164 can be seen protruding from the distal end 165. The positioning arm 160 is drilled and tapped for two screws 162*a* and 162*b*, which may be M5 cap screws in some embodiments, and which facilitate the locking of the alignment element 164 once the device 100 is positioned above the hole to be reworked.

FIG. 11C illustrates a section along line 6-6 as shown in FIG. 11B, through the head of the positioning arm 160. The aperture through the positioning arm 164 has smooth sides in order to accommodate various custom made guide bushes 161 as required by the various reaming tools 108. FIG. 11D is a perspective view of the positioning arm 160 shown with the alignment element 164 in a default position before any alignments have been made.

Figure 12:
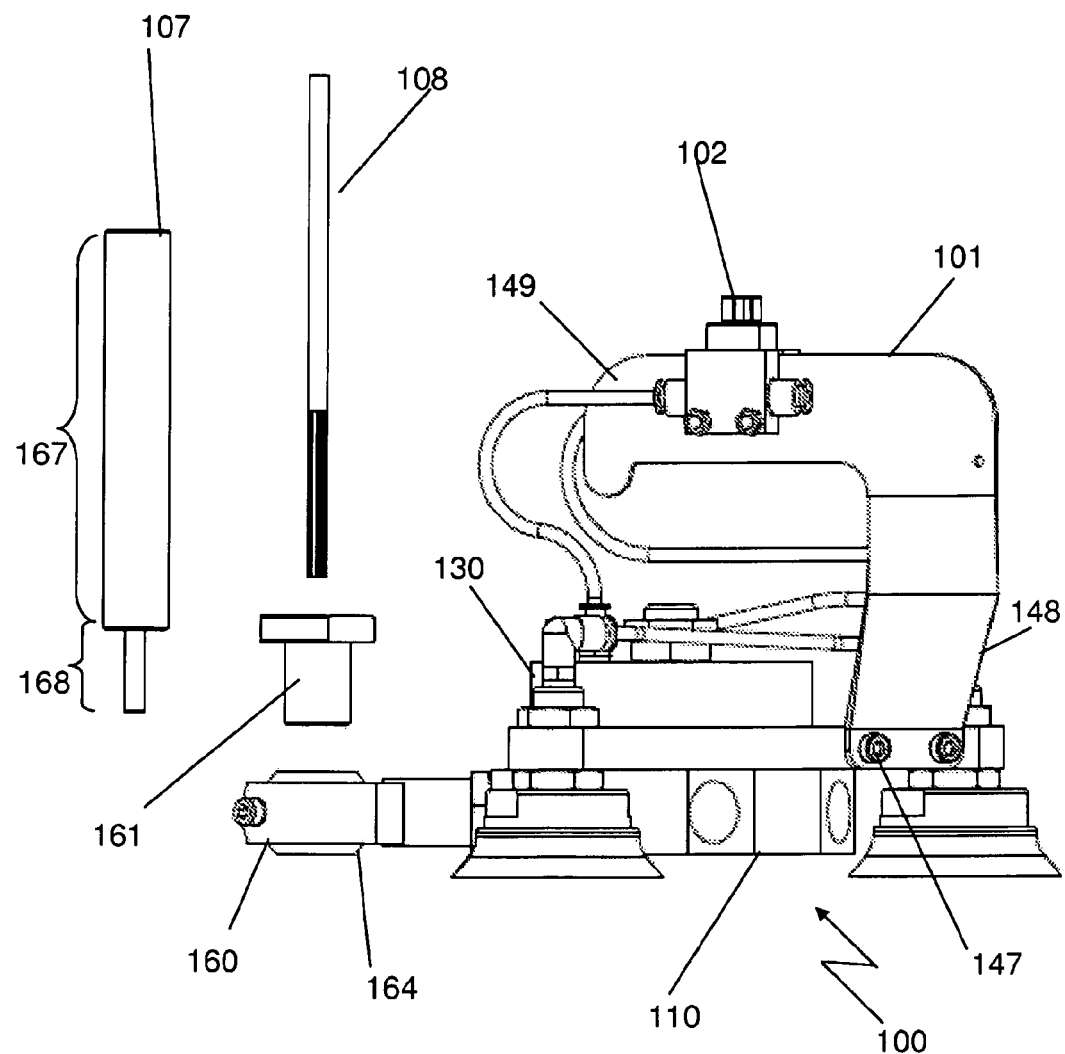
FIG. 12 is a side view of some embodiments of the device aligned with a reaming tool, guide bushing and locating pin.

FIG. 12 illustrates the device 100 in a side view, aligned with a reaming tool 108, guide bushing 161 and locating pin 107. The locating pin 107 is used, as described above, to approximately position the device 100 above the hole to be reworked. Once appropriately positioned, manually operable fixation elements, such as screws 162*a*, 162*b*, are used to fix the position of the alignment element 164, locating pin 107 is removed and the guide bushing 161 inserted into the alignment element 164. The guide bushing 161 allows for the reaming tool 108 or drilling tool (not shown) to be accurately aligned to the hole for reaming and drilling operations.

One embodiment of the locating pin 107 is shown in FIG. 12. In some embodiments, the locating pin 107 may be molded or cast from plastic or metal. In some other embodiments, the locating pin 107 may be made up of more than one material. The embodiment depicted consists of an upper part 167 and a lower part 168. The upper part 167 is received in the central bore of the alignment element 164 in a clearance fit. The upper part 167 is of a length greater than the depth of the bore through the alignment element 164, such that some of the upper part 167 of the locating pin 107 remains outside the alignment element 164 when the locating pin 107 is inserted into the bore of the alignment element 164. The part of the locating pin 107 that remains outside the alignment element 164 may be of a size and shape that allows it to be used as a handle, to manually manipulate the locating pin 107 into a desired position. Due to the snug clearance fit of the locating pin 107 within the alignment element 164, angularly manipulating the locating pin 107 causes the equivalent rotational movement (and realignment of the axis) of the alignment element 164.

The lower part 168 of the locating pin 107 may be received (in a clearance fit) in the bore of the hole to be reworked. When the lower part 168 of locating pin 107 is inside a hole to be reamed, the axis of the central bore through the alignment element 164 becomes aligned with the hole. After fastening the alignment element 164 in place using cap screws or other fixation means and removing the locating pin 107, a reaming tool 108 (and optionally a bushing) can be inserted into alignment element 164. The position of the alignment element 164 after having been positioned with the locating pin 107 should be such that the reaming tool 108, when inserted into the alignment element 164 in place of the locating pin 107, is in alignment with the hole to be reamed. Both the upper 167 and lower 168 parts of the locating pin 107 may be of a cylindrical shape, with the diameter of the upper part 167 being greater than the diameter of the lower part 168 of the locating pin 107. In some embodiments, the upper part 167 may be shaped or textured to be readily graspable by a hand.

FIG. 12 also shows the location of the handle mounting screws 147. The handle 101 is a functional item and may be made in numerous configurations. In FIG. 12 the handle 101 is shown as a hook-shaped component. At a proximal end 148 of the handle 101 is an attachment means to attach the handle 101 to the base 120. The handle 101 may be attached using screws 147 or other similar fastening means. The distal end 149 of the handle 101 may be curved in shape for ease of grip when manipulating the device 100. The distal end 149 of the handle 101 and its gripping portion may be located such that an operator's hand is separated from the clamp 130 and the hand may be positioned adjacent actuation switches 102 and 103. The handle 101 is positioned such that the mounting units 150 and the handle 101 are separated by the base unit 120 and slider 110. Sufficient clearance is required between the handle 101 and the device 100 to allow a hand to grab and release the handle 101. The upper portion of the handle 101 may extend horizontally over the base 120 and clamp space 130. In some embodiments, the handle 101 concludes with a small downwards protrusion with a rounded, smoothed end. This shape is configured for ease of manipulation by hand and smoothed and finished to avoid sharp or dangerous edges.

At the top portion of the handle 101, the pneumatic activation switch 102 and vacuum activation switch 103 are positioned adjacent each other, as best seen in FIG. 9. The pneumatic activation switch 102 and the vacuum activation switch 103 may also be affixed to the handle 101 by manually actuable fixation elements, such as small cap screws, although other attachment methods could be employed without affecting the functionality of the device 100.

FIG. 13A illustrates a top view of the device 100 including pneumatic connection points 104 and handle 101 mounting screws 147. FIG. 13B is a cross-sectional view taken through the device in FIG. 13A along line 7-7. Although similar to FIG. 2, additional details are shown with regard to the pneumatic connection points 104 and the mounting unit 150 details, including the vacuum duct 154.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

| Legend | |
|---|---|
| Ref. No. | Description |
| 100 | Alignment Device |
| 101 | Handle |
| 102 | Clamp Activation Switch |
| 103 | Vacuum Clamp Activation Switch |
| 104 | Pneumatic Connection Point |
| 105 | Vacuum Hoses for Vacuum Clamps |
| 106 | Pneumatic Hose for Clamp |
| 107 | Locating Pin |
| 108 | Reaming Tool |
| 109 | End Surface of Primary Limb |
| 110 | Slider |
| 111 | Main Positioning Arm Mount |
| 112 | Threaded Portion of Primary Mount |
| 113 | Secondary Positioning Arm Mount |
| 114 | Threaded portion of $2^{nd}$ mount |
| 115 | Tertiary Positioning Arm Mount |
| 116 | Threaded Portion of $3^{rd}$ Mount |
| 117 | Slider Threaded Central Bore |
| 118 | Primary Limb |
| 119 | Central Portion of the Base |
| 120 | Base |
| 121 | Slider Secondary Limb |
| 122 | Slider Tertiary Limb |
| 123 | Top Portion of Clamp Housing |
| 124 | Bottom Portion of Clamp Housing |
| 125 | Top Portion of the Clamp Piston |
| 126 | Piston Housing Inner Wall |
| 127 | Piston Housing Large Bore |
| 128 | Bottom Portion of the Clamp Piston |
| 129 | Base Internal Wall |
| 130 | Clamp |
| 131 | Clamp Housing |
| 132 | Clamp Piston |
| 133 | Housing Central Bore |
| 134 | Outer Clamp O-Ring Seal |
| 135 | Outer O-Ring Seal Recess |
| 136 | Inner Clamp O-Ring Seal |
| 137 | Inner O-Ring Seal Recess |
| 138 | Pneumatic Inlet/Outlet |
| 139 | Piston Seat |
| 140 | Central Stud |
| 141 | Central Bore |
| 142 | Central Washer |
| 143 | Central Nut |
| 144 | Circular Wall Within Clamp Piston |
| 147 | Handle Mounting Screws |
| 148 | Proximal End of Handle |
| 149 | Distal End of Handle |
| 150 | Mounting Unit |
| 151a | Countersunk Cap Screw |
| 151b | Countersunk Cap Screw |
| 152 | Aluminum Disc |
| 153 | Vacuum Cup |
| 154 | Vacuum Duct |
| 155 | Mounting Unit Lock Nut |
| 157 | Clamp Stud |
| 158 | Mounting Unit Body |
| 159 | Clamp Lock Nut |
| 160 | Positioning Arm |
| 161 | Guide Bushing |
| 162a | First Cap Screw |
| 162b | Second Cap Screw |
| 163 | Bronze Bush |
| 164 | Alignment Element |
| 165 | Distal End of Positioning Arm |
| 166 | Proximal End of Positioning Arm |
| 167 | Upper part of locating pin |
| 168 | Lower part of locating pin |
| 600 | Alignment Device Embodiment 2 |
| 610 | Slider |
| 611 | Main Positioning Arm Mount |
| 613 | Secondary Positioning Arm Mount |
| 615 | Tertiary Positioning Arm Mount |
| 618 | Primary Limb of the Slider |
| 619 | Central Portion of the Base |
| 620 | Base |
| 630 | Clamp |
| 631 | Clamp Housing |
| 632 | Clamp Piston |
| 634 | Outer Clamp O-Ring Seal |
| 636 | Inner Clamp O-Ring Seal |
| 638 | Pneumatic Inlet/Outlet |
| 640 | Central Stud |
| 641 | Central Bore |
| 643a | Central Nut Upper |
| 643b | Central Nut |
| 645 | Stabilizer Boss |
| 646 | Stabilizer Boss Mount Point |
| 662 | Cap Screw |
| 664 | Spherical Ball |
| 665 | Distal End of Positioning Arm |
| 666 | Proximal End of the Positioning Arm |
| 667 | Foot of the Base Plate |
| 668 | Clamping Surface |

The invention claimed is:

1. An alignment device to assist in drilling or reaming an opening in a structure, the device comprising:
a base element, the base element having at least one first fixation element to allow fixation of the base element relative to the structure;
a positioning element coupled to the base element, the positioning element comprising a slider with a flat surface configured to engage a corresponding flat surface of the base element, wherein a position of the positioning element relative to the base element is selectively adjustable with at least two translational degrees of freedom relative to the base element to allow precise positioning for a drilling or reaming tool with respect to a drilling or reaming site on the structure;
an alignment element mounted to the positioning element, wherein an angle of the alignment element is selectively adjustable with at least two rotational degrees of freedom relative to the base element to allow precise alignment for the drilling or reaming tool with respect to the drilling or reaming site on the structure;
at least one second fixation element being pneumatically actuable and configured to selectively fix the positioning element relative to the base element by forcing respective parts of the flat surfaces of the slider and the base element together to achieve frictional engagement and thereby restrict movement of the positioning element relative to the base element; and at least one third fixation element to allow fixation of the alignment element relative to the positioning element to fix the angle of the alignment element relative to the structure.

2. The device of claim 1, wherein the at least one first fixation element comprises at least two suction feet.

3. The device of claim 2, wherein the at least two suction feet comprise three suction feet.

4. The device of claim 3, wherein the three suction feet are arranged at respective vertices of a triangle.

5. The device of claim 1, wherein the at least one first fixation element comprises three pneumatically actuable suction feet.

6. The device of claim 1, wherein the at least one first fixation element comprises a plate extending away from the position of the positioning element and arranged to allow fixation of the base element relative to the structure by clamping of the plate to the structure.

7. The device of claim 6, wherein the plate is integrally formed with the base element.

8. The device of claim 1, wherein the at least one third fixation element comprises two manually operable fixation components.

9. The device of claim 1, wherein the at least one second fixation element has opposed first and second portions positioned to allow fixation of the positioning element relative to the base element.

10. The device of claim 1, wherein the positioning element comprises a positioning arm extending away from a central portion of the positioning element, the alignment element being mounted to the positioning arm.

11. The device of claim 10, wherein the positioning arm is removably coupled to the central portion of the positioning element.

12. The device of claim 10, wherein the positioning element has multiple coupling locations to which the positioning arm is removably coupleable.

13. The device of claim 1, further comprising a handle coupled to the base element to assist in positioning the device relative to the structure.

14. The device of claim 13, wherein the device has a size and weight to allow it to be manually positionable relative to the structure using one hand.

15. The device of claim 1, wherein the device is sized to be manually transportable.

16. The device of claim 1, wherein the device is arranged to be free of contact with the structure other than at the at least one first fixation element.

17. The device of claim 1, wherein the positioning element is slidably adjustable relative to the base element.

18. The device of claim 17, wherein adjustment of the positioning element relative to the base element is limited by abutment of part of the positioning element with part of the base element.

19. The device of claim 1, wherein the structure is an aircraft structure.

20. A kit comprising a device according to claim 1 and further comprising a locating pin, the locating pin comprising:
an upper part shaped to be received by the alignment element and manually manipulable to align an axis of the alignment element with the opening in the structure; and
a lower part shaped to be received by the opening in the structure.

21. A kit according to claim 20, further comprising:
at least one bushing receivable in the alignment element to act as a guide for the drilling or reaming tool.

22. An alignment device to assist in drilling or reaming an opening in a structure, the alignment device comprising:
a base element, the base element having at least one first fixation element to allow fixation of the base element relative to the structure;
a positioning element coupled to the base element, the positioning element comprising a slider with a flat surface configured to engage a corresponding flat surface of the base element, wherein a position of the positioning element relative to the base element is selectively adjustable with at least two translational degrees of freedom relative to the base element to allow precise positioning for a drilling or reaming tool with respect to a drilling or reaming site on the structure;
an alignment element mounted to the positioning element, wherein an angle of the alignment element is selectively adjustable with at least two rotational degrees of freedom relative to the base element to allow precise alignment for the drilling or reaming tool with respect to the drilling or reaming site on the structure;
at least one second fixation element configured to selectively fix the positioning element relative to the base element by forcing respective parts of the flat surfaces of the slider and the base element together to achieve frictional engagement and thereby restrict movement of the positioning element relative to the base element; and
at least one third fixation element to allow fixation of the alignment element relative to the positioning element to fix the angle of the alignment element relative to the structure,
wherein the base element has a triangular shape and the at least one first fixation element comprises three suction feet arranged at the vertices of the triangular shape.

23. An alignment device to assist in drilling or reaming an opening in a structure, the alignment device comprising:
a base element, the base element having at least one first fixation element to allow fixation of the base element relative to the structure;
a positioning element coupled to the base element, the positioning element comprising a slider with a flat surface configured to engage a corresponding flat surface of the base element, wherein a position of the positioning element relative to the base element is selectively adjustable with at least two translational degrees of freedom relative to the base element to allow precise positioning for a drilling or reaming tool with respect to a drilling or reaming site on the structure;
an alignment element mounted to the positioning element, wherein an angle of the alignment element is selectively adjustable with at least two rotational degrees of freedom relative to the base element to allow precise alignment for the drilling or reaming tool with respect to the drilling or reaming site on the structure;
at least one second fixation element configured to selectively fix the positioning element relative to the base element by forcing respective parts of the flat surfaces of the slider and the base element together to achieve frictional engagement and thereby restrict movement of the positioning element relative to the base element; and
at least one third fixation element to allow fixation of the alignment element relative to the positioning element to fix the angle of the alignment element relative to the structure, wherein the at least one second fixation element has opposed first and second portions positioned to allow fixation of the positioning element relative to the base element, and wherein the first portion includes a pneumatically actuable locking piston to selectively fix the position of the positioning element relative to the base element.

24. A device to assist in drilling or reaming an opening in a surface, the device comprising:
- a body, being removably affixable to a surface of the object to be drilled or reamed;
- a slider having a flat surface configured to engage a corresponding flat surface of the body, wherein a position of the slider relative to the body is selectively adjustable with at least two translational degrees of freedom relative to the body;
- a pneumatically actuable clamp configured to selectively fix the slider relative to the body by forcing respective parts of the flat surfaces of the slider and the body together to achieve frictional engagement and thereby restrict movement of the slider relative to the body;
- an arm, being removably affixable to the slider; and
- a receptacle adapted to receive a drilling or reaming tool or an alignment tool, wherein the receptacle is positioned at one end of the arm, and an angle of the receptacle is selectively adjustable with at least two rotational degrees of freedom relative to the arm and is fixable relative to the arm.

25. A kit comprising a device according to claim 24 and further comprising a locating pin, the locating pin comprising:
- an upper part shaped to be received by the receptacle and manually manipulable to align an axis of the receptacle with the opening in the surface; and
- a lower part shaped to be received by the opening in the surface.

26. A kit according to claim 25, further comprising:
- at least one bushing receivable in the receptacle to act as a guide for the drilling or reaming tool.

* * * * *